(12) United States Patent  (10) Patent No.: US 6,682,008 B2
Yeh                        (45) Date of Patent:     Jan. 27, 2004

(54) CABLE STORAGE BOX

(75) Inventor: Ryan Yeh, Chino Hills, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/075,359

(22) Filed: Feb. 13, 2002

(65) Prior Publication Data

US 2003/0150950 A1 Aug. 14, 2003

(51) Int. Cl.⁷ ............................................. B65H 75/48
(52) U.S. Cl. .................................. 242/378.1; 191/12.4
(58) Field of Search ................... 242/388.1, 378.1–3, 242/380, 396.6, 395, 402; 191/12.2 R, 12.4

(56) References Cited

U.S. PATENT DOCUMENTS 5,279,473 A * 1/1994 Rozon ......................... 242/377
6,226,381 B1 * 5/2001 Huang ......................... 379/438
6,254,025 B1 * 7/2001 Liao ......................... 242/378.1
6,305,632 B1 * 10/2001 Hwang ..................... 242/378.1
6,315,237 B1 * 11/2001 Hoerner ...................... 242/560
6,374,970 B1 * 4/2002 Liao ........................... 191/12.4
6,378,797 B1 * 4/2002 Liao ......................... 242/378.1
6,397,991 B1 * 6/2002 Chang ....................... 191/12.4
6,401,892 B1 * 6/2002 Chang ....................... 191/12.4
6,415,898 B1 * 7/2002 Liao ........................... 191/12.4
6,474,585 B2 * 11/2002 Liao ......................... 242/378.1
2002/0053622 A1 * 5/2002 Kagel

* cited by examiner

Primary Examiner—Kathy Matecki
Assistant Examiner—Sang Kim
(74) Attorney, Agent, or Firm—Wei Te Chung

(57) ABSTRACT

A cable storage box for a telephone or other communications extension cord comprises a cover, a reel and a housing. The housing has an opening with a leading edge formed thereon. The leading edge has a taper surface with a retention portion formed thereon for engaging with corresponding jack when the jack tends to be pulled out.

7 Claims, 7 Drawing Sheets

CABLE STORAGE BOX

BACKGROUND OF THE INVENTION

1. Field of the Invention

The present invention relates generally to elongated cord storage devices and, more particularly, to a cable storage box for a telephone or other communications extension cord.

2. Description of the Related Art

Over the years, there have been many attempts to provide retractable reels for a diverse multitude of applications, and in one particular application, the desirability of a cable storage box for telephone extension cords has been recognized. Various mechanisms and equipment have been proposed to eliminate tangling of telephone cords and the like. Coiled cords are commonly used, however, these cords lose resiliency after prolonged use and fail to retract into compact coils. Even when coiled, the cord can still become entangled with other cords such as computer cords, keyboard cords and the like.

For instance, U.S. Pat. No. 1,276,825, issued on Aug. 27, 1918, to D. Swope discloses a reel disposed within a box wherein a loaded spring is utilized. A cord extends from a signal box, enters the box, and is wrapped around a spindle, and the cord is then wrapped around a reel, exits the box, and is secured to a telephone. Unfortunately, the invention requires a spindle device in which the cord is wrapped in an extended axial direction, greatly increasing the size of the box.

U.S. Pat. No. 4,384,688, issued on May 24, 1983 to J. N. Smith discloses a retractable reel which permits the extension and retraction of a cord through a pair of openings. Smith uses a loaded spring for retracting the cord. Further, Smith provides a ratchet gear having a pawl with an accompanying spring to retain the cord in a selected position of extension. The disadvantage is that the using of the spring and the ratchet gear makes the structure of the reel complicate and difficult to be manufactured, and so the cost of manufacturing is high.

There are some similar products available in the market, but they are all spring driven design, which provides retrieving force and tension to keep RJ11 cable in position.

The present invention is directed to overcoming the above stated problems and accomplishing the stated objects by providing an economical and compact cable storage box.

SUMMARY OF THE INVENTION

An object of the present invention is to provide a more economical cable storage box with fewer parts and which may be more easily manufactured.

A further object of the present invention is to provide a cable storage box which can be easily managed manually without using of extra spring.

To achieve the above objects, the present invention provides a cable storage box for a telephone or other communications extension cord which comprises a cover, a reel and a housing. The housing has an opening with a leading edge formed thereon. The leading edge has a taper surface with a retention portion formed thereon for engaging with corresponding jack when the jack is about to be pulled out.

DESCRIPTION OF PREFERRED EMBODIMENTS OF THE INVENTION

Reference will now be made to drawing figures to describe the present invention in detail.

Figure 1:
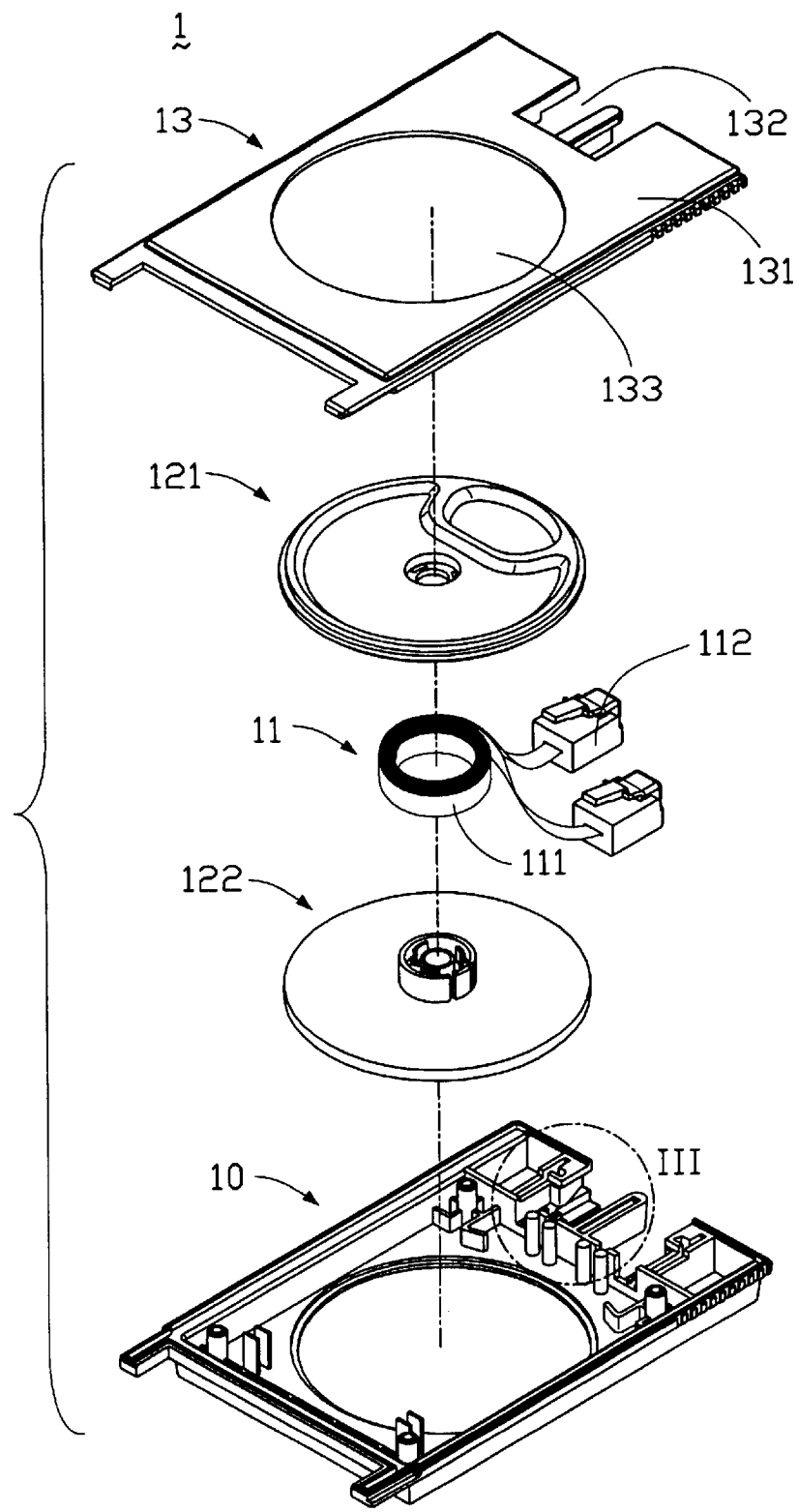
FIG. 1 is an exploded perspective view of a cable storage box in accordance with a preferred embodiment of the present invention.

As shown in FIG. 1, a cable storage box 1 in accordance with the present invention comprises a housing 10, a cord 11, a top disk 121, a bottom disk 122 and a top cover 13 is formed for engaging with the housing 10.

Figure 2:
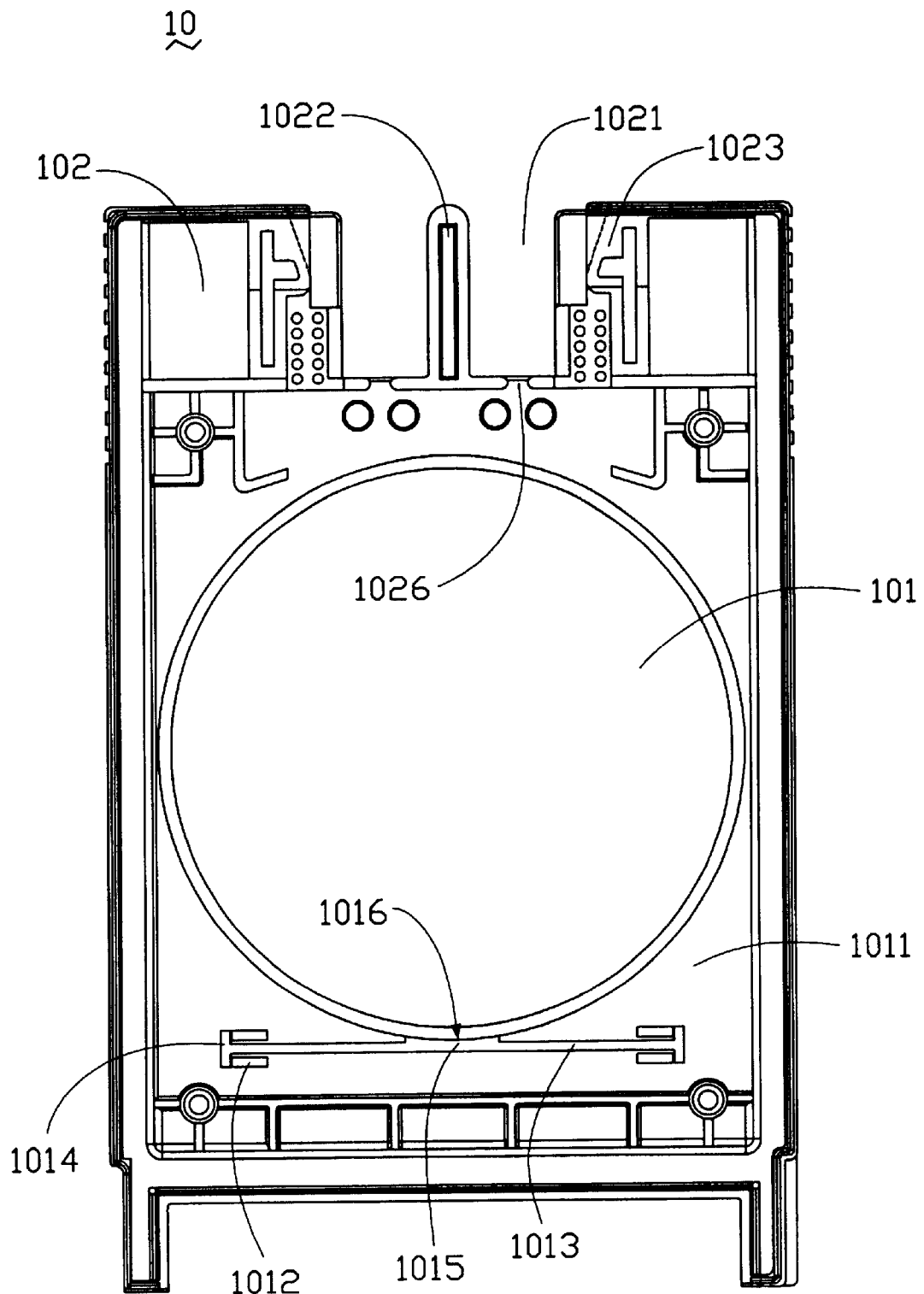
FIG. 2 is a top view of a housing of the cable storage box of FIG. 1.

As shown in FIG. 2, the housing 10 is substantially rectangular shaped and comprises a reel receiving portion 101 and a jack receiving portion 102. The reel receiving portion 101 has a bottom plate. Two pairs of retention posts 1012 are formed on the bottom plate 1011. An elongate friction spring plate 1013 has two retention portions 1014 formed on each end thereof for being secured between the retention posts 1012. A friction portion 1015 is formed substantially in the middle of the friction spring plate 1013. A curved friction surface 1016 is defined on the friction portion 1015 for constantly in frictional contact with the top disk 121 and the bottom disk 122.

Figure 3:
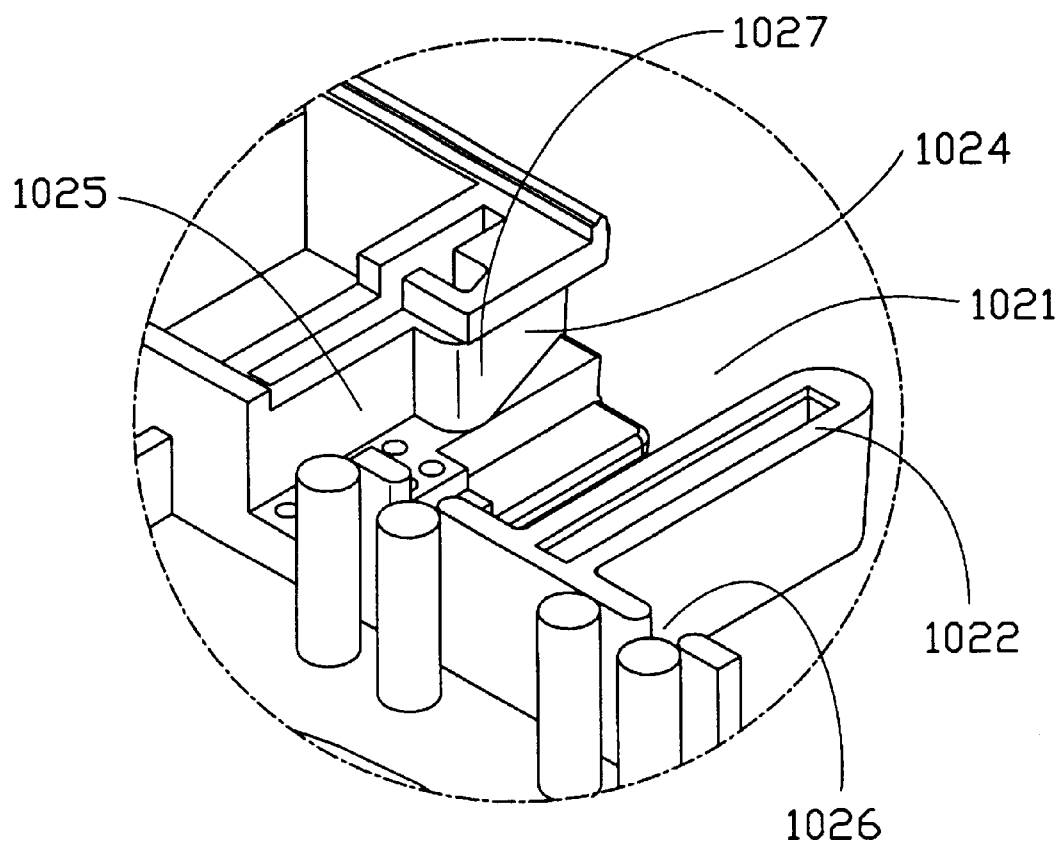
FIG. 3 is an enlarged view of a circled portion III of FIG. 1.
Figure 4:
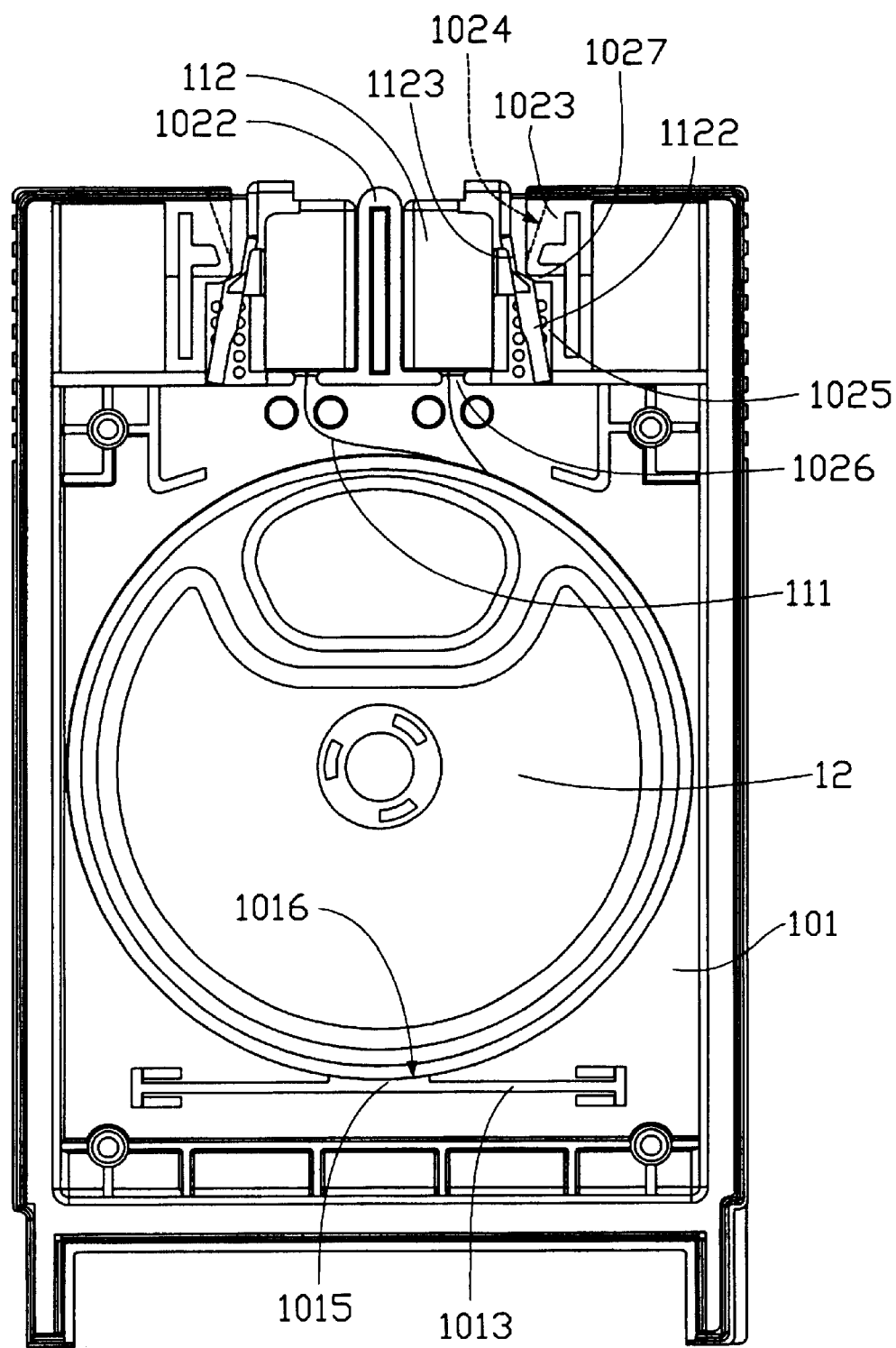
FIG. 4 is an assembled view of the cable storage box.

As shown in FIGS. 2, 3 and 4, the jack receiving portion 102 has two openings 1021 defined therein. A rib 1022 is defined between the openings 1021 for spacing the openings apart. The opening 1021 further comprises a leading edge 1023 with a taper surface 1024 formed thereon, and a retention portion 1027 is formed on the taper surface 1024, the taper surface 1024 and the rib 1022 together defining an access for corresponding jack 112. A latch receiving room 1025 is defined in the housing 10 immediately behind the taper surface 1024. A slit 1026 is located in the bottom of the two openings 1021 respectively.

Figure 5:
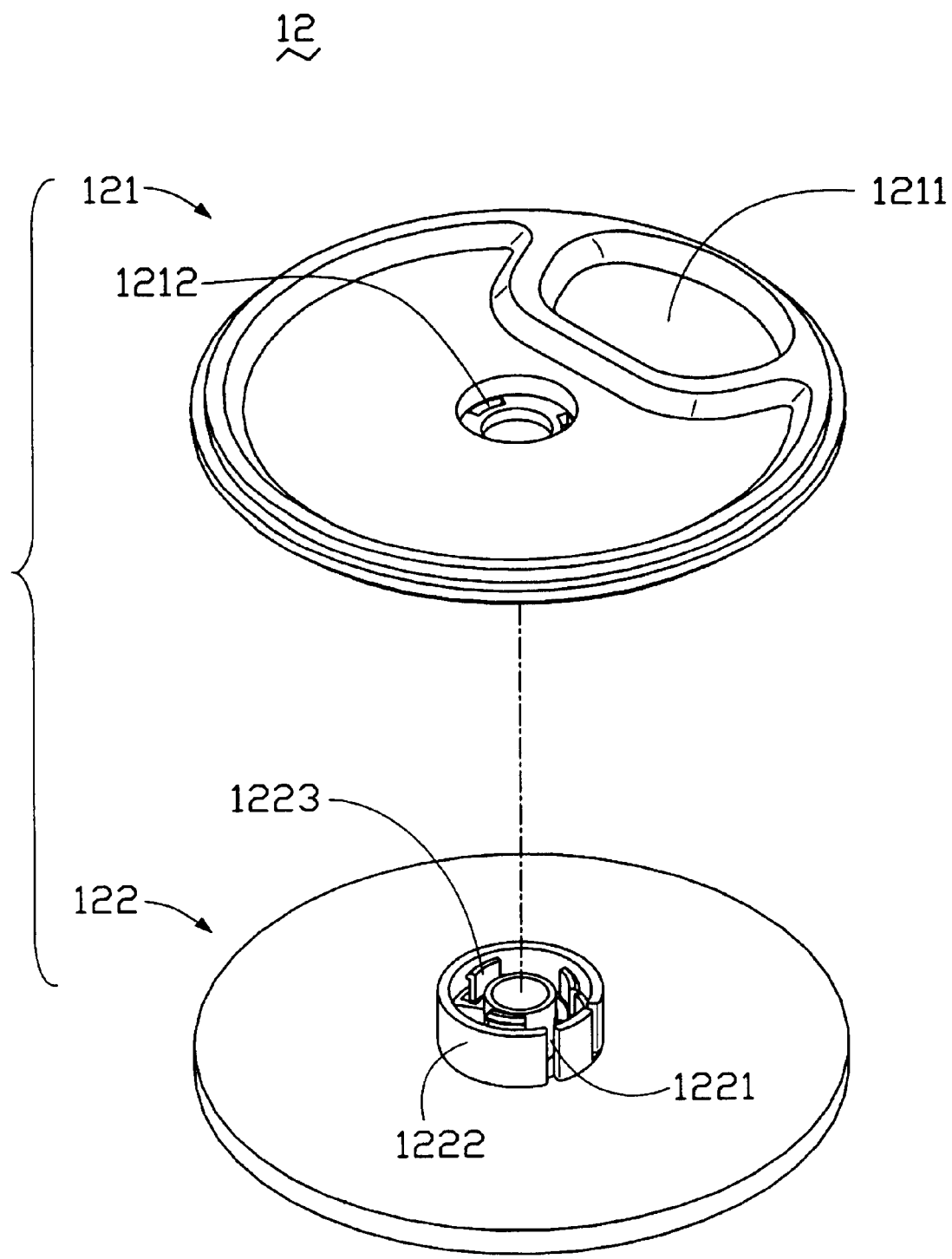
FIG. 5 is an exploded perspective view of a reel of the cable storage box of FIG. 1.
Figure 6:
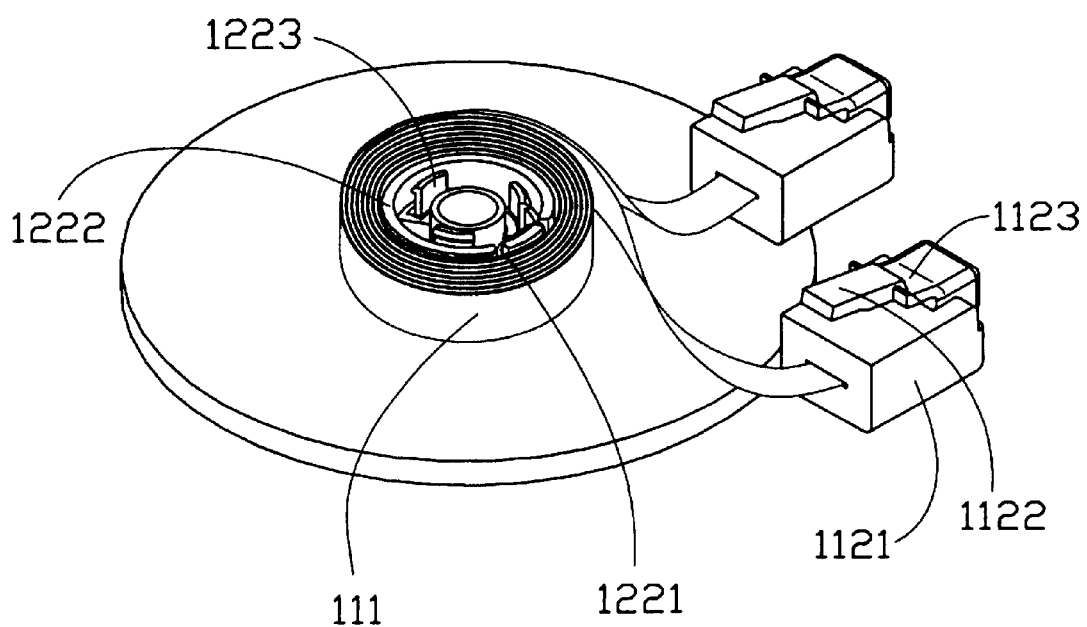
FIG. 6 is an assembled view of the reel and a cord.

As shown in FIGS. 1, 5 and 6, the top disk 121 has a handle 1211 for manual operation and three holes 1212. The bottom disk 122 has an axle 1222 with two recess portions 1221 cut therein and three tabs 1223.

Referring to FIGS. 1 and 6, the cord 11 includes a cable wire 111 and two modular jack connectors 112 are electrically connected to two ends of the cable wire 111. Furthermore, the modular jack 112 has a housing 1121, and a spring latch 1122 extending from a base portion 1123 of the housing 1121.

As shown in FIG. 1, the top cover 13 comprises a top plate 131, a recess 132 and a circular opening 133 defined therein and positioned corresponding to the jack receiving portion 102 and the reel receiving portion 101 respectively when the top cover 13 and the housing 10 are engaged together.

As shown in FIG. 6, in assembly, the cable wire 111 of the cord 11 is positioned in the recess portions 1221 of the bottom disk 122, then the cable wire 111 is clamped and secured by the two recess portions 1221, whereby the cable wire 111 will be coiled on the axle 1222 when the bottom disk is spun by manually operating the handle 1211.

As shown in FIGS. 4 and 5, when the holes 1212 of the top disk 121 are engaged with the tabs 1223 of the bottom disk 122 to form a reel 12, the reel 12 is placed in the reel receiving portion 101, and a portion of the cable wire 111 which is adjacent to the modular jack 112 is placed in the slit 1026. When the cable wire 111 is coiled on the reel 12 and the modular jack 112 is pulled back, the modular jack 112 can be easily received in the opening 1021 due to the formation of the taper surface 1024, and then the spring latch 1122 is received in the latch receiving room 1025 and the base portion 1123 is located just beside the retention portion 1027 of the taper surface 1024. When the modular jack 112 is about to be pulled out of the housing 10 by mistake or by undesirable forces, the retention portion 1027 will be engaged with the spring latch 1122 and the elastic of the spring latch 1122 will prevent the modular jack 112 from being pulled out, whereby the modular jack 112 can be securely retained in the opening 1021. When the two modular jacks 112 need to be pulled out, since the height and the width of the rib 1022 are low and narrow, the two modular jacks 112 can be snapped and pulled out only with two thumbs simultaneously.

When the reel 12 is spun manually, the top disk 121 and the bottom disk 122 of the reel 12 will constantly being in frictional engagement with the curved friction surface 1016 of the friction portion 1015 of the friction spring plate 1013, whereby the reel 12 cannot be freely spun and the operation of the handle 1211 can be more easily and accurately.

Figure 7:
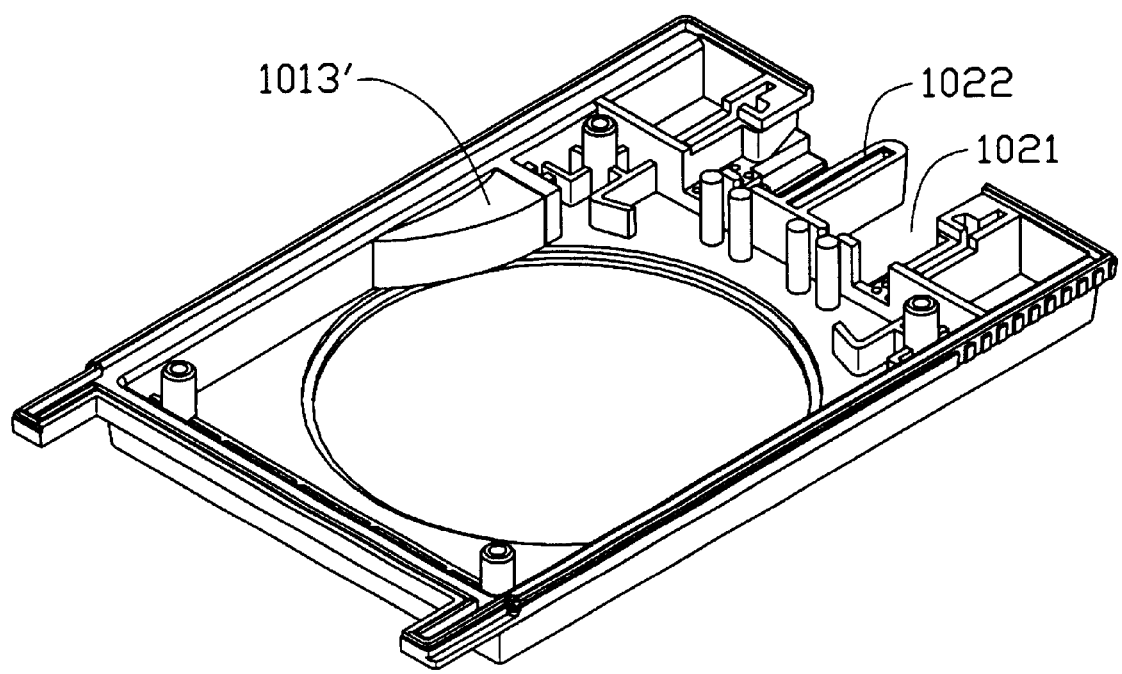
FIG. 7 is a perspective view of a housing in accordance with another preferred embodiment of the present invention.

FIG. 7 illustrates another embodiment according to the present invention. The housing 10' is substantially identically configured to the first embodiment, except for the configuration of the friction spring plate 1013'.

Although described in the context of a particular embodiment, it will be realized that a number of modifications to these teachings may be made by one skilled in the art. Thus, while the invention has been particularly shown and described with respect to a specific embodiment thereof, it will be understood by those skilled in the art that changes in form and shape may be made thereto without departing from the scope and spirit of the invention as expressed in the appended claims.

What is claimed is:

1. A cable storage box comprising:
   a housing defining a first opening around an edge portion and a second opening around a center portion of a planar face of said housing;
   a reel rotatably disposed in the housing and accessible from an exterior via said second opening in a direction perpendicular to said planar face; and
   a core including a cable wire and a connector, said connector configured to be retained in said first opening, said cable wire coiling around said reel; wherein
   a retention portion of the housing engages a latch of said connector to retain the connector substantially completely in said first opening, and said latch is operative/accessible along said direction and depressed in another direction substantially perpendicular to said direction, to be disengaged from said retention portion so that the core is able to be pulled out from the housing.

2. The cable storage box as claimed in claim 1, herein the housing at the first opening comprises a leading edge having a tapered surface formed thereon.

3. The cable storage box as claimed in claim 2, wherein the retention portion is formed on the tapered surface of the leading edge.

4. The cable storage box as claimed in claim 3, wherein a rib is defined in the first opening for bifurcating the first opening.

5. The cable storage box as claimed in claim 4, wherein a latch receiving room is defined in the housing behind the tapered surface for accommodating the latch of the connector.

6. The cable storage box as claimed in claim 1, wherein the housing further defines a plurality of retention posts, and a friction spring plate secured by the retention posts for frictionally engaging with the reel.

7. The cable storage box as claimed in claim 6, wherein the friction spring plate comprises a friction portion for being constantly in frictional engagement directly with the reel.

* * * * *